(12) United States Patent
Eto et al.

(10) Patent No.: US 6,252,898 B1
(45) Date of Patent: Jun. 26, 2001

(54) SPREAD SPECTRUM COMMUNICATION METHOD AND SYSTEM WHEREIN DATA RATE OF DATA TO BE TRANSMITTED IS CHANGED IN ACCORDANCE WITH TRANSMISSION QUALITY

(75) Inventors: Yoshizumi Eto, Sagamihara; Takashi Asahina, Kawasaki, both of (JP)

(73) Assignee: Hitachi Denshi Kabushiki Kaisha, Tokyo (JP)

( * ) Notice: Subject to any disclaimer, the term of this patent is extended or adjusted under 35 U.S.C. 154(b) by 0 days.

(21) Appl. No.: 08/680,812

(22) Filed: Jul. 16, 1996

(30) Foreign Application Priority Data

Jul. 19, 1995 (JP) .................................................. 7-182738

(51) Int. Cl.[7] .................................................. H04K 1/00
(52) U.S. Cl. .......................... 375/130; 375/141; 370/342
(58) Field of Search .................................. 375/200, 202, 375/206, 130, 140, 141, 146, 147, 220, 285, 296, 346; 370/335, 342, 441, 479; 455/69

(56) References Cited

U.S. PATENT DOCUMENTS

| | | | |
|---|---|---|---|
| 4,991,184 | * 2/1991 | Hashimoto | 375/219 |
| 5,056,109 | * 10/1991 | Gilhousen et al. | 370/342 |
| 5,321,721 | * 6/1994 | Yamaura et al. | 375/208 |
| 5,335,247 | * 8/1994 | Olmstead | 375/200 |
| 5,335,249 | * 8/1994 | Krueger et al. | 375/206 |
| 5,341,396 | * 8/1994 | Higgins et al. | 375/130 |
| 5,471,650 | * 11/1995 | Vexler et al. | 455/69 |
| 5,546,411 | * 8/1996 | Leitch et al. | 371/5.5 |
| 5,581,583 | * 12/1996 | Conti et al. | 375/347 |
| 5,598,416 | * 1/1997 | Yamada et al. | 370/468 |
| 5,774,785 | * 6/1998 | Karlsson | 455/522 |
| 5,790,537 | * 8/1998 | Yoon et al. | 370/342 |
| 5,912,921 | * 6/1999 | Warren et al. | 375/220 |
| 6,084,919 | * 7/2000 | Kleider et al. | 375/285 |

OTHER PUBLICATIONS

Dixon, R.C., Spread Spectrum Systems. New York: John Wiley & Sons, Inc., 1984 (2d ed.), pp. 9–12.*

* cited by examiner

Primary Examiner—Stephen Chin
Assistant Examiner—Chieh M. Fan
(74) Attorney, Agent, or Firm—Antonelli, Terry, Stout & Kraus, LLP

(57) ABSTRACT

A spread spectrum communication method includes the steps of measuring a parameter indicative of a C/N value of a received signal at one station during a communication between stations remote from each other in accordance with a spread spectrum communications scheme, and changing the data rate of a signal to be transmitted from another station when the C/N value changes by a predetermined value or more.

26 Claims, 5 Drawing Sheets

SPREAD SPECTRUM COMMUNICATION METHOD AND SYSTEM WHEREIN DATA RATE OF DATA TO BE TRANSMITTED IS CHANGED IN ACCORDANCE WITH TRANSMISSION QUALITY

BACKGROUND OF THE INVENTION

The present invention relates to an improved spread spectrum communication method and communications system.

Referring first to FIG. 2, in a radio communications system utilizing spread spectrum modulation system, data to be transmitted applied at an input terminal 15 is multiplied by a spread code generated by a spread code generator 16 in a spread modulator 17. Here, the multiplication of digital data means a logical exclusive OR operation.

Specifically, the value (1 or 0) of binary data to be transmitted is left as it is when the value of the spread code is zero, while the polarity of the data to be transmitted is inverted when the value of the spread code is one.

Explaining in detail with reference to FIG. 3, where data to be transmitted is represented by (A) and a spread code by (B), the data to be transmitted (A) is spread modulated on the spread code (B) to generate a signal as illustrated in FIG. 3(C). As can be seen from FIGS. 3(A)–(C), the modulated signal (C) has the polarity of data reverse to the polarity of the spread code (B) during a period in which the data to be transmitted (A) is at one level.

Here, the spread code may be random data having a data rate which is an integer multiple of that of the data to be transmitted, and an M-series code, for example, may be used therefor. The M-series code has a finite recursive period (for example, approximately 1,000 bits), and may be regarded as a pseudo random code.

As a result of the multiplication of the data to be transmitted (A) by the spread code (B), the data to be transmitted is converted into a random code having the data rate equal to that of the spread code, as illustrated in FIG. 3(C).

Assuming that the data rate of the data to be transmitted is $f_T$ and the data rate of the spread code is $f_D$, the latter is divided by the former to derive g ($f_D/f_T$=g) which is called the "spread gain".

A bandwidth occupied by the data to be transmitted depends on the contents of the data (amount of information). When the data is random (including many high frequency components), it has a frequency bandwidth substantially corresponding to $f_T$.

A bandwidth occupied by the data to be transmitted multiplied by the spread code does not depend on the contents of the data to be transmitted, in which case the resulting data has a frequency bandwidth substantially corresponding to $f_D$.

Referring back to FIG. 2, an output of the spread modulator 17 is modulated, for example, in accordance with the BPSK (binary phase shift keying) scheme in a modulator 18, and then converted into a high frequency signal in a frequency convertor 19. In the radio transmission in accordance with the spread spectrum modulation scheme, a 2.4 GHz bandwidth in an ISM (industrial scientific and medical equipment) band is used as a frequency band for such high frequency signals. The high frequency signal is transmitted through a transmission antenna 20.

The high frequency signal transmitted from the transmission antenna 20 is received by a reception antenna 21 at a receiving station, and converted into an intermediate frequency signal in a frequency convertor 22. Then, the intermediate frequency signal is demodulated to random data having the data rate $f_D$ in a BPSK demodulator 23.

Explaining in greater detail with reference again to FIG. 2, a spread code generator 24 generates the same spread code as that generated on the transmission side (called the "inverse spread code). The inverse spread code is multiplied by the demodulated random data in the inverse spread demodulator 25. As a result of the multiplication in the inverse spread demodulator 25, if the inverse spread code has the value of zero, the value of the demodulated data is left as it is. Conversely, if the inverse spread code has the value of one, the polarity of the demodulated data is inverted.

In other words, when received data, identical to the spread modulated data to be transmitted (C) as illustrated in FIG. 3, is multiplied by the inverse spread code identical to the spread code (B), the received data identical to the data to be transmitted (A) is derived.

Thus, if the recursive period and the phase of the spread code on the transmission side are maintained identical to those of the inverse spread code on the reception side, received data equal to transmitted data is delivered at an output terminal 26.

The spread spectrum scheme features that an originally imparted bandwidth $f_T$ of data is expanded to a wider bandwidth $f_D$ for transmission, so that the S/N (signal to noise) ratio of a received signal is increased by a factor of g equal to the spread gain, thus enabling signals to be transmitted even on a transmission path exhibiting a low S/N ratio.

In the spread spectrum communications scheme, a C/N (carrier to noise) ratio is degraded in a receiver under communication when another spread spectrum transmitter approaches thereto. More specifically, assuming that the approaching spread spectrum transmitter has a carrier (a portion inputted to the receiver under communication) C1, noise N introducing into the receiver is increased to N+$C_1$, whereby the C/N ratio is degraded to C/(N+$C_1$). In other words, other nearby transmitters may interfere with a receiver under communication.

U.S. Pat. No. 5,056,109 discloses that the transmission power of a mobile station is adjusted in accordance with a communication distance from the mobile station to others in a cellular mobile telephone system to prevent the carrier of the mobile station from interfering with other nearby mobile stations, as mentioned above.

The transmission power may be controlled by a variety of schemes, such as open loop control, closed loop control, and so on. However, the addition of any control scheme would make the entire system more complicated.

SUMMARY OF THE INVENTION

It is an object of the present invention to provide a spread spectrum communication method and communications system which are capable of performing high quality communications without employing a complicated configuration.

In the spread spectrum communication method according to the present invention, during a communication in accordance with the spread spectrum communications scheme between two stations remote from each other, a parameter indicative of a C/N value of a received signal is measured at one of the stations. If the measured C/N value presents a change equal to or larger than a predetermined value, the data rate of a signal to be transmitted from the other station is changed.

Also, a spread spectrum communications system according to the present invention has a first communications station including a unit for spread spectrum modulating an input signal with a spread code and a unit for converting a spread spectrum modulated signal into a radio frequency signal and transmitting the radio frequency signal, and a second communications station including a receiver unit for receiving a radio frequency signal from the first communications station and reproducing a spread spectrum modulated signal, a demodulator unit for inverse spread spectrum demodulating the spread spectrum modulated signal with an inverse spread code having the same period and phase as the spread code, a unit for detecting a parameter indicative of a C/N value of the received signal in the receiver unit, and a unit for communicating information on the detected C/N value to the first communications station. The first communications station also has a control unit for receiving the information on the C/N value and changing the data rate of a signal to be transmitted from the first communications station when the C/N value presents a change equal to or more than a predetermined value.

In the present invention, the data rate of a signal to be transmitted is reduced to maintain a predetermined C/N value even if the C/N value (or the S/N value) of a received signal is degraded. Alternatively, if the C/N value of a received signal is excessively high, the data rate of a signal to be transmitted may be increased to enable a larger amount of information to be transmitted while maintaining the predetermined C/N value. The principle of the present invention will be briefly described below.

In the spread spectrum communications scheme, the ratio of a transmission bandwidth, i.e., the data rate $f_D$ of a spread code to the data rate $f_T$ of a code to be transmitted is the spread gain g, as mentioned above. In conventional systems, $f_D$ and $f_T$ are fixed, so that the systems are operated with the spread gain g maintained constant.

Also, the C/N value, S/N ratio, and spread gain are in the following relationship:

S/N=C/N+Spread Gain      (unit: dB)

The relationship between the spread gain and the S/N ratio is described in "Spread Spectrum Systems", pp 10–11 (Japanese version), written by R. C. Dixon, and published by JATEC Publications, copyright by John Willey & Sons Inc. in U.S.A.

Thus, even if the C/N ratio is degraded, a predetermined S/N ratio can be obtained by increasing the spread gain. For changing the spread gain, it is necessary to change the data rate of a spread code or the data rate of a code to be transmitted. However, a change in the data rate of the spread code will cause the transmission bandwidth to change, thus giving rise to a practical problem. Thus, the data rate of the code to be transmitted is preferably changed, although causing variations in an amount of transmissible information per unit time, to realize a predetermined S/N ratio with a transmission bandwidth maintained constant.

As a result, a predetermined communication quality can be maintained with a simple configuration instead of a complicated system such as a transmission power control system.

DESCRIPTION OF THE PREFERRED EMBODIMENTS

Figure 1:
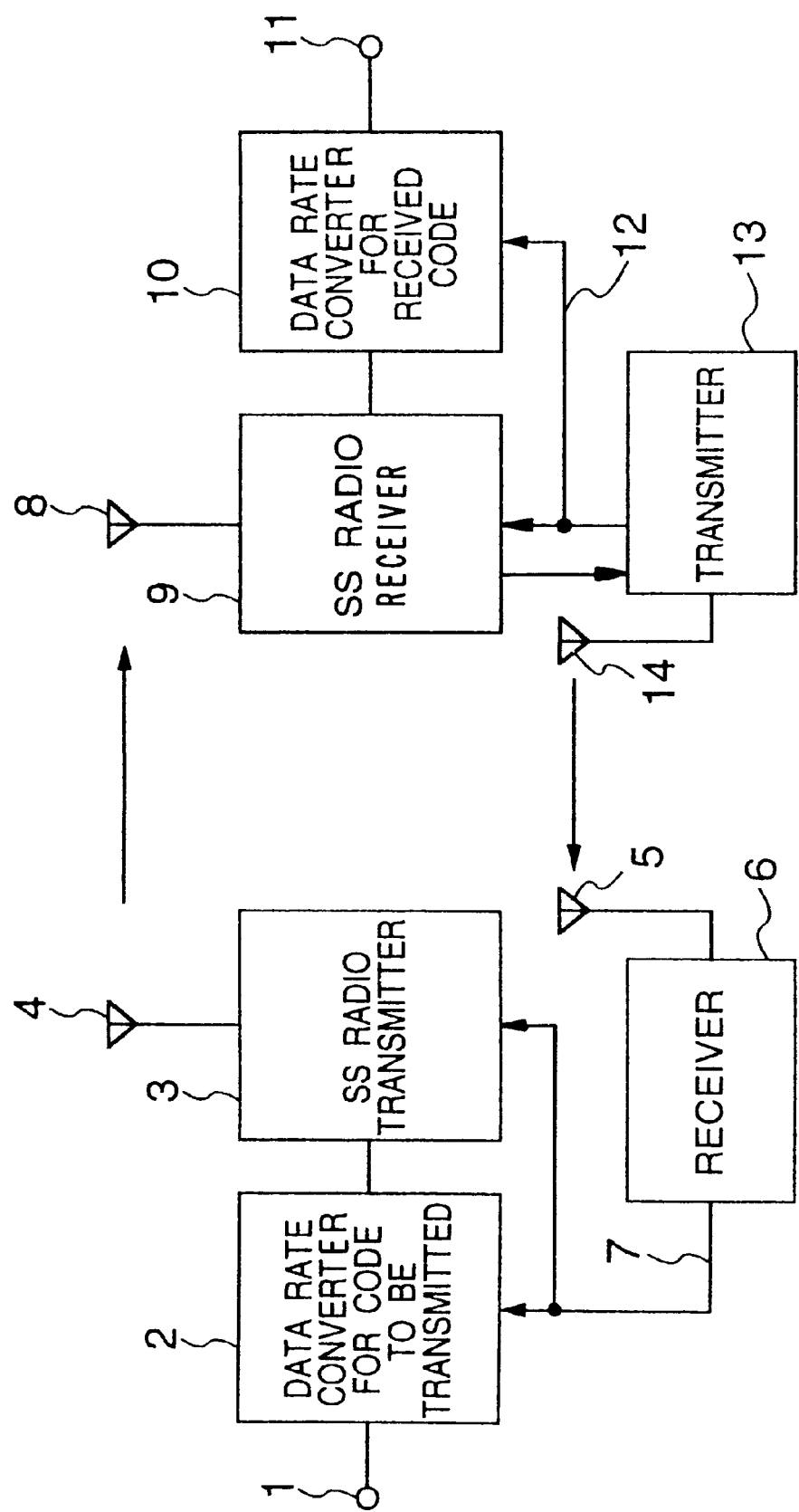
FIG. 1 is a block diagram illustrating an embodiment of a spread spectrum communications system according to the present invention.
Figure 2:
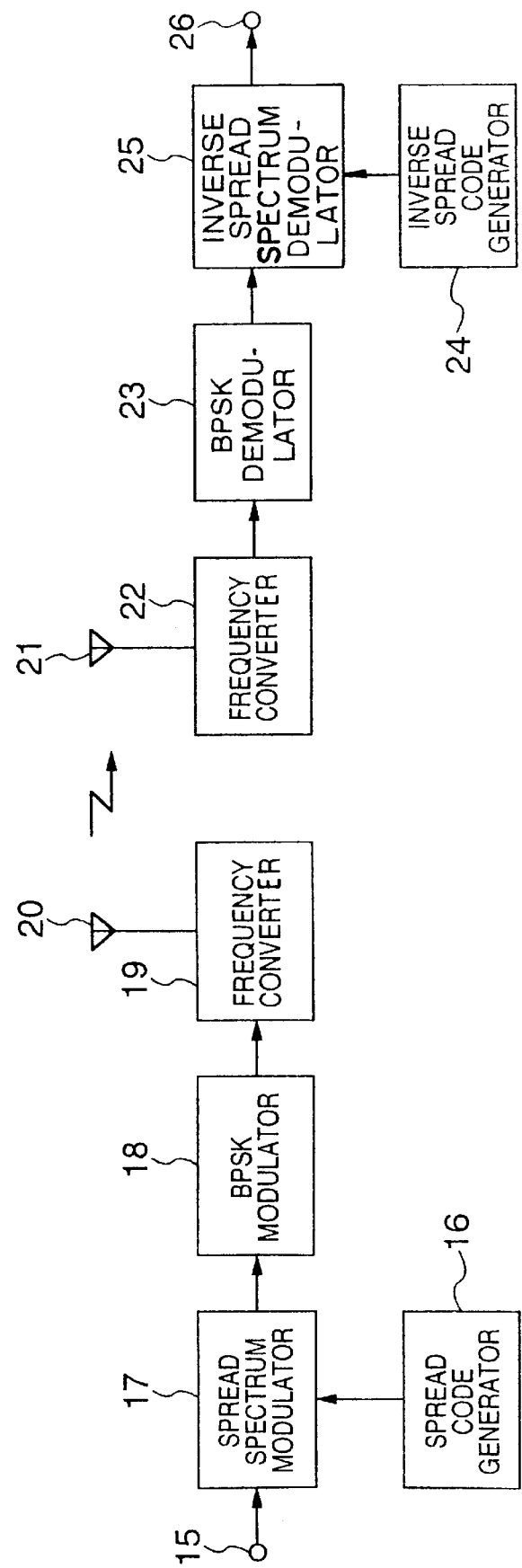
FIG. 2 is a block diagram for explaining a spread spectrum radio communications system.
Figure 3:
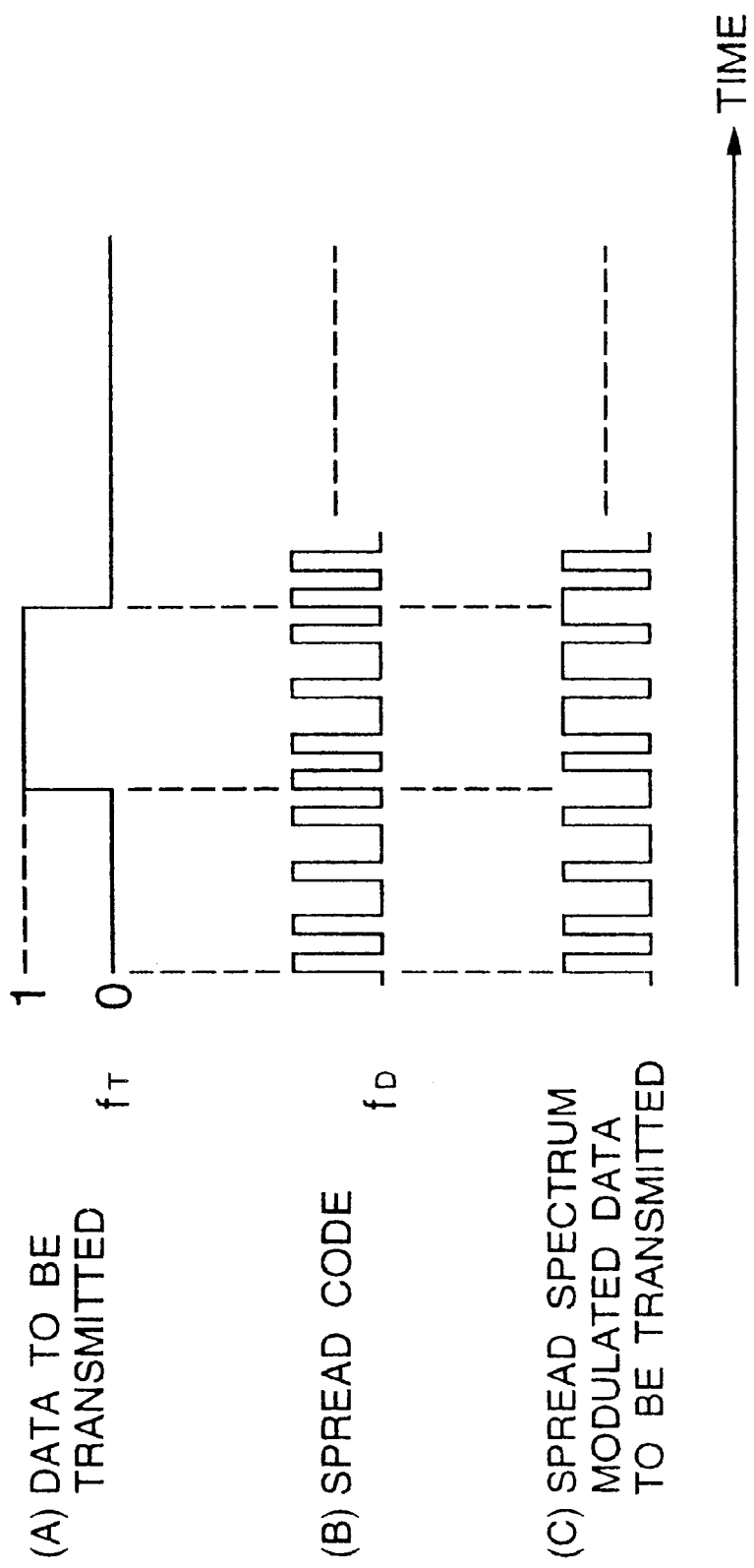
FIG. 3 shows waveform charts for explaining the spread spectrum modulation.

FIG. 1 illustrates a block diagram of an embodiment of a spread spectrum radio communications system according to the present invention. Referring specifically to FIG. 1, the system comprises an input terminal 1 for receiving a code to be transmitted; a data rate convertor 2 for the code to be transmitted; a spread spectrum radio transmitter 3; a transmission antenna 4; a reception antenna 5; a receiver 6 for receiving C/N information; received C/N information 7; a reception antenna 8; a spread spectrum radio receiver 9; a data rate convertor 10 for a received code; an output terminal 11; detected C/N information 12; a transmitter 13 for the C/N information; and a transmission antenna 14.

On the transmission side, the data rate of a code to be transmitted, inputted to the input terminal 1, is converted to a previously set predetermined data rate in the data rate convertor 2. The code to be transmitted is then multiplied (spread modulated) by a spread code at a predetermined data rate in the spread transmitter 3. In an example, the code to be transmitted is modulated in accordance with the BPSK scheme, and subsequently converted into a signal in a transmission frequency band (for example, 2.4 GHz band) and transmitted from the antenna 4.

On the reception side, on the other hand, a transmitted signal from the transmission side is received by the spread spectrum radio receiver 9 through the antenna 8. The received signal, after being subjected to frequency conversion and BPSK demodulation, is outputted from the terminal 11 via the data rate convertor 10, where data rate is preset in a predetermined data rate in conformity with the data rate of the transmitted signal. Simultaneously, received C/N information is detected based on the received signal in the receiver 9. The C/N information is then transmitted through a transmission path from the reception side to the transmission side, i.e., through the transmitter 13 and the antenna 14. The data rate at the data rate convertor 2 is changed in accordance with the C/N information transmitted from the transmitter 13.

Again on the transmission side, the C/N information from the reception side is received by the receiver 6 through the antenna 5. The C/N information 7 from the reception side is sent to the data rate convertor 2. If the C/N value on the reception side is out of a predetermined level range, the data rate of the code to be transmitted is changed in the data rate convertor 2 based on the C/N information 7. In this event, the data rate convertor 2 is set such that the data rate of the code to be transmitted is converted to a data rate determined in correspondence to the contents of the C/N information 7. For example, if data indicative of the C/N value is equal to or less than a predetermined value, the data transmission rate is adjusted in the reducing direction. Conversely, if data indicative of the C/N value is larger than the predetermined value, the data transmission rate may be increased.

Here, when a data terminal at the reception side operates independent from the clock signal of transmission side, for example in a start-stop synchronization system, it is necessary to generate a clock signal at the reception side for reproducing the original signal from the transmitted signal. The clock signal generated at the reception side must be matched with the data rate of the transmitted signal. In this case, the C/N information is also provided to the data rate convertor 10 in order to convert the data rate of received code signal in conformity with the changed data rate at the transmission side. When a data terminal at the reception side operates automatically in synchronism with the clock contained in the transmitted signal, the data rate conversion at the data rate convertor 10 is not necessary.

It should be noted that the detection of the C/N value on the reception side may be carried out by detecting, for example, the S/N ratio after spread spectrum modulation or a code error ratio of received data, both of which are associated with the C/N value.

If the C/N value does not yet fall under the allowable level range even after changing the data rate of the code to be transmitted, the data rate is again reduced by predetermined steps, and the above-mentioned operations are repeated until the received C/N value satisfies predetermined conditions. If a sudden drop of the C/N value results in out loss of synchronization of the system, thus disabling communications, the data rate of the code to be transmitted may be reduced, for example, to a settable minimum value in order to give priority to the re-establishment of synchronization.

The embodiment of FIG. 1 illustrates a one-way communications system where one is the transmission side and the other is the reception side. In a bi-directional communications system where both communications stations includes a transmitter and a receiver, received C/N information associated with both the communications stations may be inserted in respective signals to be spread spectrum transmitted, in order to transmit the received C/N information of both stations to each other. In this case, the transmitter 6 and the receiver 13 dedicated to transmit and receive the C/N information are not required.

Also, in the bi-directional communications system as mentioned above, if received C/N values simultaneously lower on both sides, the data rates of the codes to be transmitted from both the stations may be gradually reduced by a predetermined step width on both sides, such that communications are mutually performed therebetween at the time a predetermined C/N value is derived. For example, the data rate convertor 10 may be programmed to automatically execute a procedure for again reducing the transmission data rate, if no improvement in the received C/N value is found in a predetermined time after a signal for reducing the data rate has been transmitted to the opposite party.

The foregoing embodiment has been described in connection with an example in which the C/N value changes during communications. According to this embodiment, if a predetermined C/N value cannot be ensured immediately after a communication is started, the data rate of a code to be transmitted is reduced to a predetermined value to achieve a desired communication quality.

Figure 4:
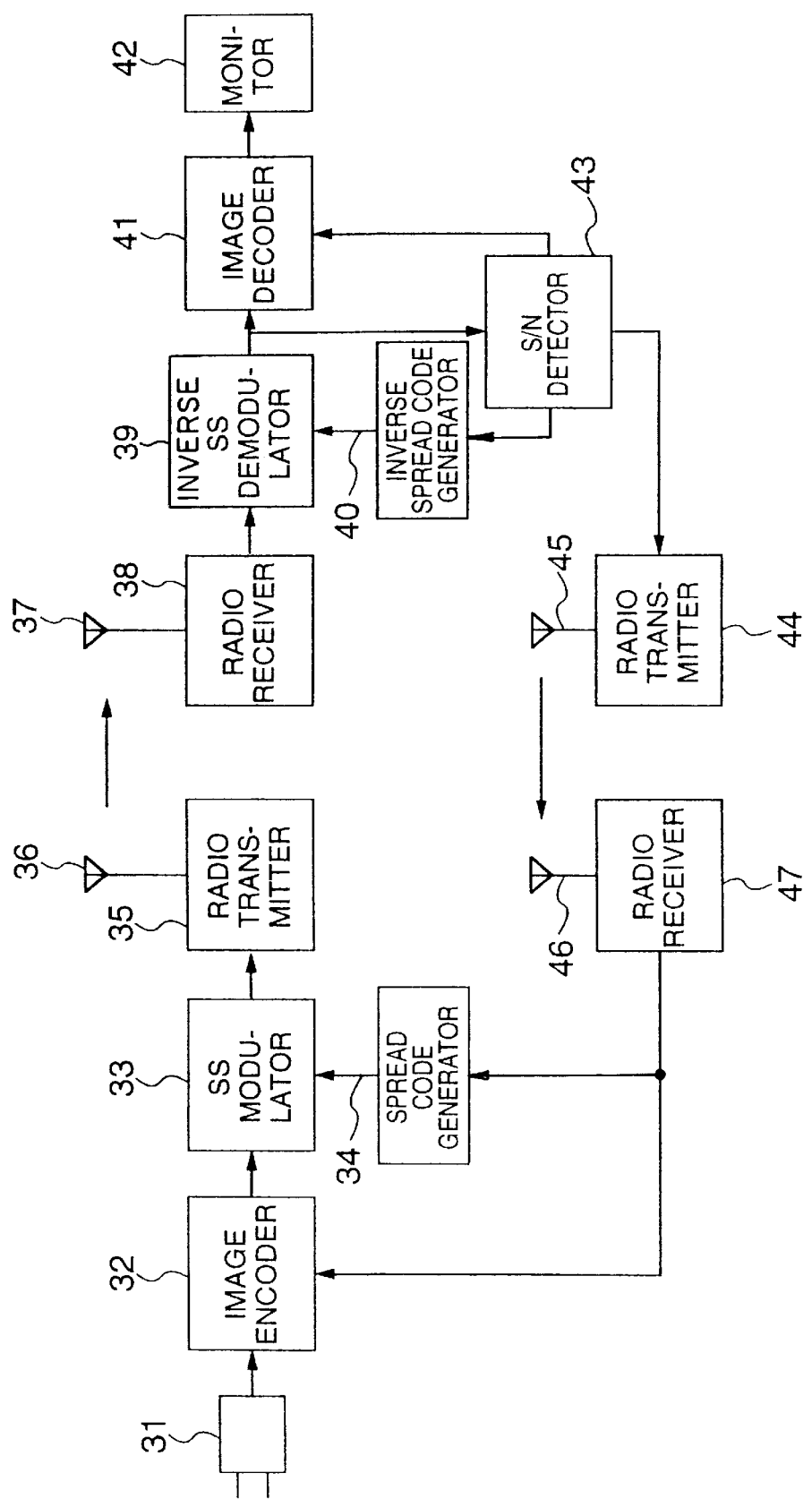
FIG. 4 is a block diagram illustrating another embodiment of the spread spectrum communications system according to the present invention.

Next, a specific embodiment of the present invention will be described with reference to a block diagram of FIG. 4. FIG. 4 illustrates a system in which an image signal is transmitted to the reception side by a spread spectrum communication. On the transmission side, an image signal imaged by a TV camera 31 is encoded by an image encoder 32. The image encoder 32 is configured to be able to change a clock speed, upon encoding an image, to change the data rate. The image signal encoded herein is multiplied by a spread code 34 in a spread spectrum modulator 33 to be converted into a spread spectrum data which is transmitted from a radio transmitter 35 through a transmission antenna 36 in a 2.4 GHz band and at transmission power per band of 10 mW/MHz.

It should be noted that the system of this embodiment is intended to transmit quasi-moving image signals at a rate of 2–12 frames per second and that the system employs, as the spread code 34 for this purpose, a spread code having a data rate of 60–10 times higher than a data rate of video signals, by way of example.

On the reception side, data transmitted from the radio transmitter 35 through the antenna 36 is received by an antenna 37. The received signal is frequency converted in a radio receiver 38 and supplied to an inverse spread spectrum demodulator 39. In the inverse spread spectrum demodulator 39, the received signal is multiplied by an inverse spread code 40 having the same frequency and phase as the spread code 34 for demodulation. The demodulated signal is decoded to the original image signal in an image decoder 41 and displayed on a monitor 42.

In the meantime, a C/N value of the received signal is detected from an S/N value detected from the inverse spread spectrum demodulated signal by an S/N detector 43. A signal indicative of the detected C/N value is transmitted to the image data transmission side from a radio transmitter 44 through an antenna 45. A specific small power data radio transmission scheme, for example, at frequency of 430 MHz and power of 10 mW may be used for the transmission of the detected C/N signal. The transmitted C/N detection signal is received by a radio receiver 47 through an antenna 46.

The C/N detection signal is then applied to the image encoder 32 which changes the data rate for the encoding in accordance with the level of the detection signal. For example, the image encoder 32 is configured to switch the data rate in a stepwise manner, such as 1.536, 0.768, 0.384 Mbps, and operates to reduce the data rate by one step if the C/N detection level lowers, for example, below 6 dB. This results in increasing the spread gain g, thus improving the S/N ratio in consequence.

On the reception side, on the other hand, it is also necessary to change the data rate for decoding in the image decoder 41 of the data terminal in conformity to the data rate changed in the image encoder 32 on the transmission side in a same manner as mentioned above. Specifically, the C/N detection signal converted from the S/N value detected by the S/N detector 43 is applied to the image decoder 41 which changes the data rate in accordance with a level change of the C/N detection signal.

Next, an example of a method of changing the data rate without using a detected S/N ratio will be described in connection with the detection of a communication difficult situation or a communication disabled situation through clock disappear information, out-of-synchronization information, or bit error information.

Figure 5:
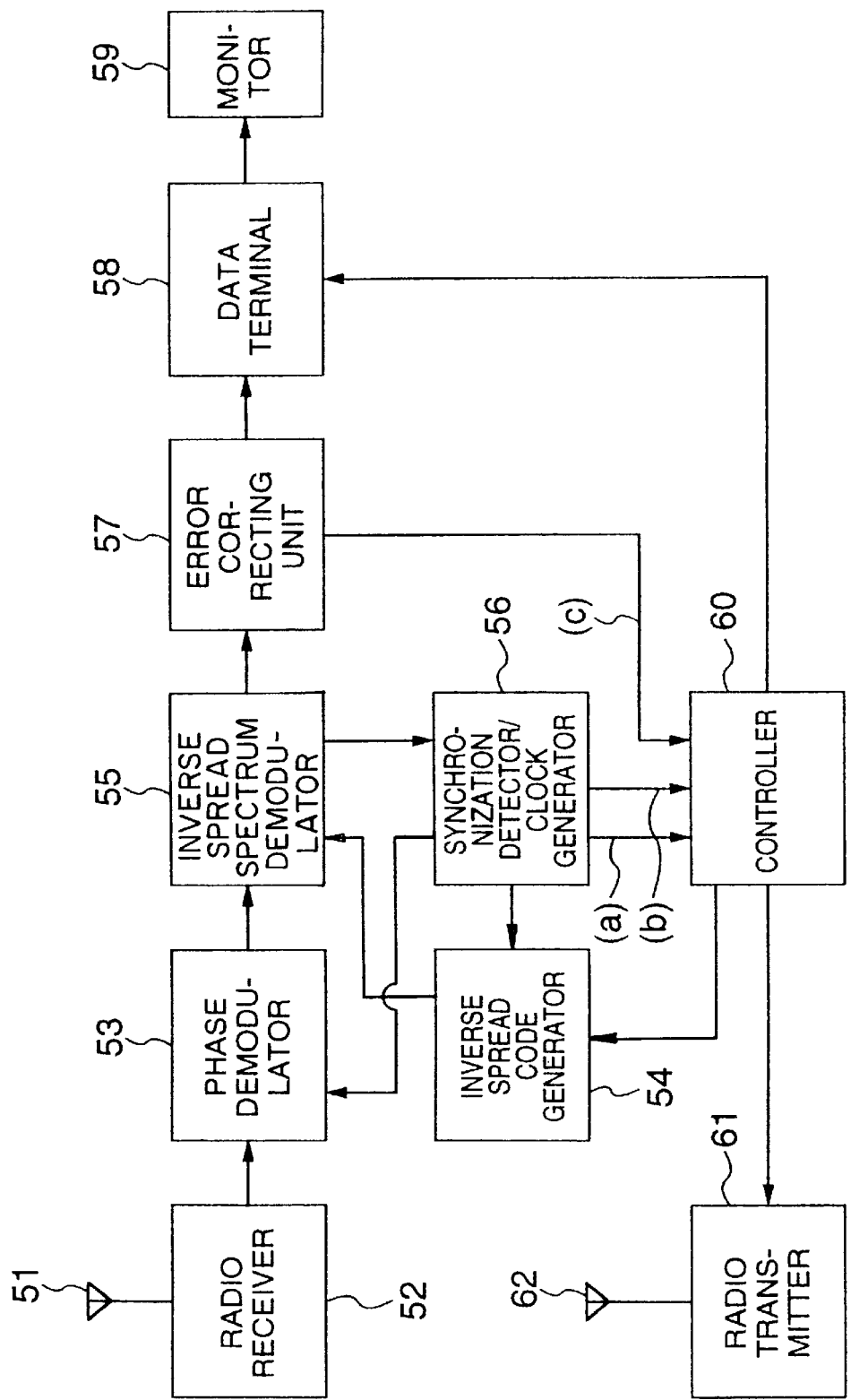
FIG. 5 is a block diagram illustrating an embodiment of a receiver which may be used in the spread spectrum communication according to the present invention.

FIG. 5 illustrates a block diagram of an embodiment of a receiver employing the spread spectrum scheme according to the present invention. Data transmitted from the transmission side is received by a radio receiver 52 through an antenna 51, converted into an intermediate frequency signal, amplified, and then supplied to a phase demodulator 53. The phase demodulator 53 performs, for example, BPSK demodulation on the received signal. An inverse spread demodulator 55, which is supplied with an inverse spread code generated by an inverse spread code generator 54, inverse spread spectrum demodulates the received signal.

The inverse spread spectrum demodulated signal is supplied to an error correcting unit 57 as well as to a synchronization detector/clock generator 56. The synchronization detector/clock generator 56 generates a clock signal and a frame synchronization signal from the inverse spread spectrum demodulated signal. The clock signal is supplied to the inverse spread code generator 54 in order to match the frequency of the inverse spread code with the frequency of the spread code on the transmission side.

The frame synchronization signal in turn is supplied to the phase demodulator 53 which uses the frame synchronization signal as the basis of the phase demodulation. A signal phase-demodulated in the phase demodulator 55, after passing through the error correcting unit 57 for detecting possible code errors, is sent to a data terminal 58 in which an original image is decoded and displayed on a monitor 59.

If the synchronization detector/clock generator 56 cannot correctly generate the synchronization signal or the clock signal, the synchronization detector/clock generator 56 detects such a situation and correspondingly supplies out-of-synchronization information (a) or clock disappear information (b) to a controller 60.

The controller 60 is also supplied with bit error information (c) from the error correcting unit 57. In the controller 60, a threshold value is set for the bit error information. For example, the bit error information is data that corresponds to a bit error rate $10^{-6}$ when the number of error bits is one for the number of bits being $10^6$.

The controller 60 gives a data rate changing instruction to the data terminal 58 to reduce the data rate by a predetermined value if the C/N value lowers to cause bit errors to increase above the set threshold value. Also, if either the out-of-synchronization information or the clock disappear information is supplied to the controller 60, the communication is disabled. Thus, the controller 60 instructs the terminal 58 to reduce the data rate until the synchronization signal and/or the clock signal can be generated again.

The controller 60, simultaneously with the supply of the data rate changing instruction to the data terminal 58, controls the radio transmitter 61 to transmit data for instructing the transmission side to similarly change the transmission data rate through the antenna 62, such that the data rate is simultaneously changed on the transmission side. This operation is similar to that in the embodiment described above. If the threshold value is set to a limit value which barely permits a received image to be reproduced, data can be transmitted at a minimally receivable data rate.

According to the present invention as described above, a predetermined S/N ratio can be maintained by controlling the data rate of a code to be transmitted on the transmission side to change the gain, when a received C/N value changes. It is therefore possible to solve the aforementioned problem arising when mobile stations are located close to each other in a spread spectrum communication system without relying on a complicated power controller.

What is claimed is:

1. A spread spectrum communication method comprising the steps of:
   converting an input signal into data to be transmitted having a predetermined data rate;
   spread spectrum modulating the data to be transmitted with a spread code;
   converting the spread spectrum modulated signal into a radio frequency signal for transmission;
   receiving the radio frequency signal and demodulating the spread spectrum modulated signal with an inverse spread code having the same period and phase as the spread code;
   detecting a parameter indicative of a C/N value of the received signal; and
   changing the data rate of the data to be transmitted and a length of the spread code in response to the C/N value.

2. A method according to claim 1, wherein the data rate of the data to be transmitted is changed in accordance with a changing amount of the C/N value when the C/N value changes by a predetermined value or more.

3. A method according to claim 2, wherein the data rate of the data to be transmitted is decreased when the C/N value decreases.

4. A method according to claim 3, wherein synchronization information in the received signal is detected for measuring the parameter indicative of the C/N value; and
   wherein the data rate of the data to be transmitted from the other station is decreased when the synchronization information cannot be detected.

5. A method according to claim 3, wherein error bits in the received signal are detected for measuring the parameter indicative of the C/N value; and
   wherein the data rate of the data to be transmitted from the other station is decreased when the number of detected error bits exceeds a predetermined value.

6. A method according to claim 3, wherein clock information in the received signal is detected for measuring the parameter indicative of the C/N value; and
   wherein the data rate of the data to be transmitted from the other station is decreased when the clock information cannot be detected.

7. A method according to claim 3, wherein at least one of detection of the S/N ratio of the received signal, detection of synchronization information in the received signal, detection of error bits in the received signal, and detection of clock information in the received signal is performed as measurements of parameters indicative of the C/N value; and
   wherein the data rate of the data to be transmitted is decreased when part or all of detected parameters do not satisfy predetermined conditions.

8. A method according to claim 2, wherein the data rate of the data to be transmitted is increased when the C/N value increases.

9. A method according to claim 2, wherein the S/N ratio of the received signal is measured as the parameter indicative of the C/N value.

10. A method according to claim 9, wherein the data rate of the data to be transmitted is controlled to maintain the S/N ratio at a predetermined value.

11. A method according to claim 2, wherein bit errors in the received signal are detected as the parameter indicative of the C/N value.

12. A method according to claim 2, wherein the C/N value of the received signal is transmitted to the other station through a communication system different from the spread spectrum communication.

13. A method according to claim 2, wherein the C/N value of the received signal is transmitted to the other station through the same communication system as the spread spectrum communication.

14. A method according to claim 1, further comprising the step of decreasing the data rate of the data to be transmitted from the other station until the C/N value reaches a predetermined value if the C/N value measured immediately after starting a communication is below a predetermined value.

15. A method according to claim 1, further comprising the step of changing a data rate at the one station in accordance with the changing of the data rate at the other station.

16. A spread spectrum communication system comprising:
   a first communication station including
   a converter for converting an input signal into data to be transmitted having a predetermined data rate,
   a spread code generator for generating a spread code,
   means for spread spectrum modulating the data to be transmitted with the spread code, and
   means for converting the spread spectrum modulated signal into a radio frequency signal and transmitting the radio frequency signal; and
   a second communication station including
      receiving means for receiving the radio frequency signal from the first communication station and reproducing the spread spectrum modulated signal therefrom,
      an inverse spread code generator for generating an inverse spread code having the same period and phase as the spread code,
      demodulating means for inverse spread spectrum demodulating the spread spectrum modulated signal with the inverse spread code,
      means for detecting a parameter indicative of a C/N value of the received signal in the receiving means and controlling the system to change a length of the inverse spread code in response to the C/N value, and
      means for communicating information on the detected C/N value to the first communication station;
   the first communication station further including
      means for receiving the information on the C/N value, and
      control means for controlling the system to change the data rate of the data to be transmitted and a length of the spread code in response to the C/N value.

17. A system according to claim 16, wherein the first communication station further includes image encoding means for encoding an input video signal; and
   wherein the spread spectrum modulating means spread spectrum modulates the encoded video signal with the spread code.

18. A system according to claim 17, wherein the means for detecting a parameter measures the S/N ratio of an inverse spread spectrum demodulated signal as the parameter indicative of the C/N value.

19. A system according to claim 18, wherein the control means controls the data rate of the data to be transmitted to maintain the S/N ratio at a predetermined value.

20. A system according to claim 19, wherein the second communication station further includes:
   decoding means for decoding the inverse spread spectrum demodulated video signal; and
   means for indicating the data rate used for decoding the video signal in the decoding means based on the C/N value provided by the means for detecting a parameter.

21. A system according to claim 19, wherein the transmission rate of the spread code is set in a range of 10–60 times higher than the transmission rate of the video signal.

22. A system according to claim 17, wherein the means for detecting a parameter includes means for detecting synchronization information in the received signal as the parameter indicative of the C/N value;
   wherein the communicating means communicates a signal indicative of lost synchronization to the first communication station when the synchronization information cannot be detected; and
   wherein the control means, in response to the signal indicative of lost synchronization, decreases the data rate of the data to be transmitted.

23. A system according to claim 17, wherein the means for detecting a parameter includes means for detecting error bits in the received signal as the parameter indicative of the C/N value;
   wherein the communicating means communicates bit error information when the number of the bit errors exceeds a predetermined value; and
   wherein the control means, in response to the bit error information, decreases the data rate of the data to be transmitted.

24. A system according to claim 17, wherein the means for detecting a parameter includes means for detecting clock information in the received signal as the parameter indicative of the C/N value;
   wherein the communicating means communicates clock disappear information when the clock information cannot be detected; and
   wherein the control means, in response to the clock disappear information, decreases the data rate of the data to be transmitted.

25. A system according to claim 16, wherein the second communication station further includes
   a converter for converting an input signal into data to be transmitted having a predetermined data rate,
   a spread code generator for generating a spread code,
   means for spread spectrum modulating the data to be transmitted with the spread code, and
   means for converting the spread spectrum modulated signal into a radio frequency signal and transmitting the radio frequency signal;
   wherein the first communication station further includes
      receiving means for receiving the radio frequency signal from the second communication station and reproducing the spread spectrum modulated signal therefrom,
      an inverse spread code generator for generating an inverse spread code having the same period and phase as the spread code,
      demodulating means for inverse spread spectrum demodulating the spread spectrum modulated signal with the inverse spread code,
      means for detecting a parameter indicative of a C/N value of the received signal in the receiving means and controlling the system to change a length of the inverse spread code in response to the C/N value, and
      means for communicating information on the detected C/N value to the second communication station; and
   wherein the second communication station further includes
      means for receiving the information on the C/N value, and
      control means for controlling the system to change the data rate of the data to be transmitted and a length of the spread code in response to the C/N value.

26. A system according to claim 25, wherein the communicating means is means for adding the information on the C/N value to the input signal in each of the first communication station and the second communication station.

* * * * *